United States Patent [19]
Lee

[11] Patent Number: 6,081,297
[45] Date of Patent: Jun. 27, 2000

[54] MPEG-2 ENCODER PRE-PROCESSOR FOR PROCESSING SDTV VIDEO AND HDTV SPLIT PICTURE VIDEO

[75] Inventor: Jin-Hwan Lee, Daejeon, Rep. of Korea

[73] Assignees: Electronics and Telecommunications Research Institute, Daejeon; Korea Telecommunication Authority, Seoul, both of Rep. of Korea

[21] Appl. No.: 08/769,112

[22] Filed: Dec. 18, 1996

[30] Foreign Application Priority Data

Dec. 19, 1995 [KR] Rep. of Korea ................ 95-52168

[51] Int. Cl.[7] ...................................... H04N 7/12
[52] U.S. Cl. ..................... 348/426; 348/441; 348/705
[58] Field of Search .................. 348/405, 413, 348/416–426, 21, 432, 453, 384, 390, 441, 423, 706, 705; 345/155, 156; H04N 7/12

[56] References Cited

U.S. PATENT DOCUMENTS

| | | | |
|---|---|---|---|
| 5,010,392 | 4/1991 | Croll | 348/21 R |
| 5,187,575 | 2/1993 | Lim . | |
| 5,218,436 | 6/1993 | Sugiyama et al. | 358/141 |
| 5,325,131 | 6/1994 | Penney | 348/406 |
| 5,479,209 | 12/1995 | Miyazaki | 348/426 |
| 5,604,541 | 2/1997 | Kim et al. | 348/426 |
| 5,642,169 | 6/1997 | Yamamoto et al. | 348/445 |
| 5,659,356 | 8/1997 | Asaida et al. | 348/222 |
| 5,764,293 | 6/1998 | Uz et al. | 348/390 |
| 5,801,778 | 9/1998 | Ju | 348/416 |

OTHER PUBLICATIONS

"A Palplus Compatible HDTV Encoder System", G. Schmidt, L.S. Dooley, and W.P. Buchwald, 1994 IEEE.

"An Implementation of Pre–processor Chip for SDTV/ HDTV Video Encoder Base on the MPEG–2 Standard", Jinhwan Lee, Sanggyu Park, ETRI, Proceedings of ITC–CSCC, Jul. 1996.

*Primary Examiner*—Howard Britton
*Assistant Examiner*—Tung Vo
*Attorney, Agent, or Firm*—Jacobson, Price, Holman & Stern PLLC

[57] ABSTRACT

A moving picture expert group 2(MPEG-2) encoder preprocessor for processing split picture video of standard definition (SDTV) and high definition television (HDTV). The MPEG-2 encoder pre-processor includes signal separation and synchronizing signal detector, multiplexor, and video processor. The pre-processor is capable of processing both of SDTV video and HDTV split picture video by performing the processes such as 4:2:2/4:2:0 conversion, pre-processing adaptive filtering and scene change detection, so as to simplify the compression of the video from the input video signals. Accordingly, there is no need to develop pre-processors for SDTV and HDTV, individually.

1 Claim, 1 Drawing Sheet

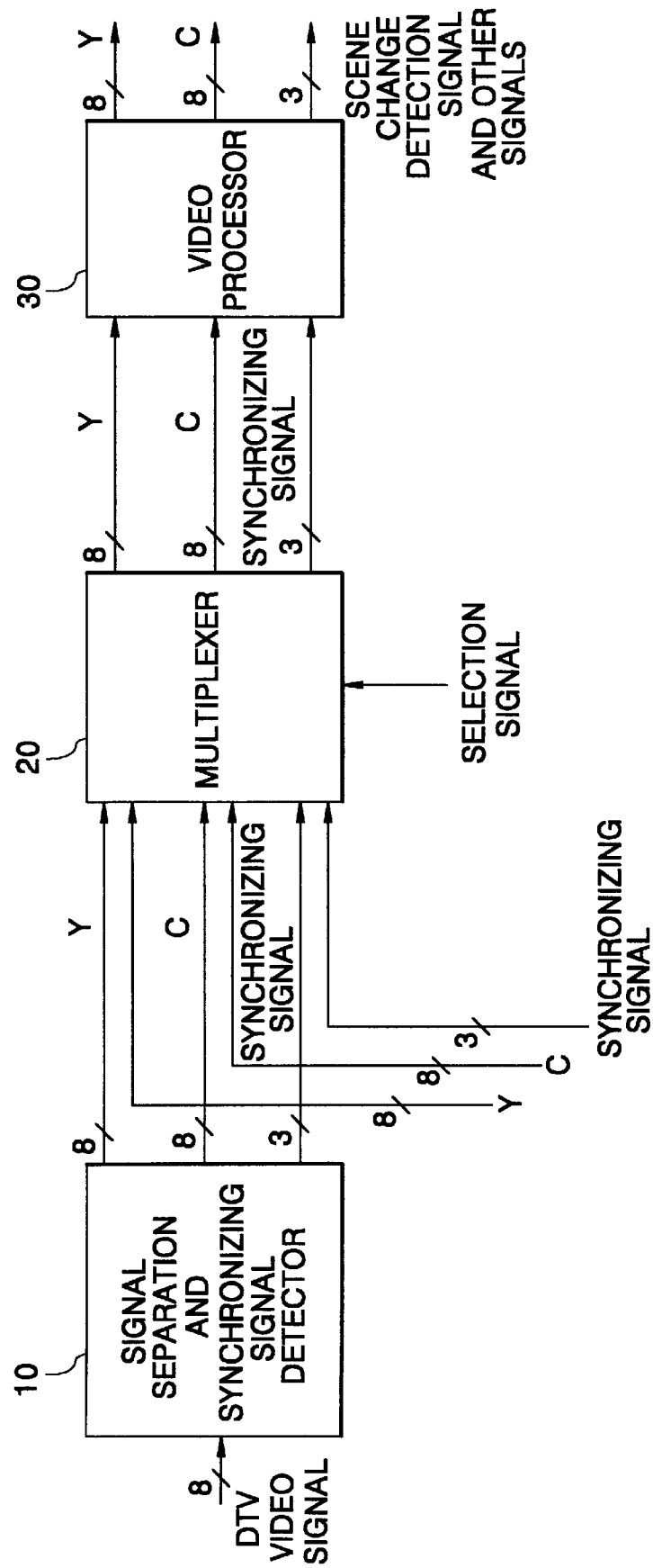

MPEG-2 ENCODER PRE-PROCESSOR FOR PROCESSING SDTV VIDEO AND HDTV SPLIT PICTURE VIDEO

BACKGROUND OF THE INVENTION

The present invention relates to a moving picture expert group 2(MPEG-2) encoder pre-processor for processing split picture video of standard definition television(DTV) and high definition television(HDTV).

SDTV and HSDTV are different in picture size and processing speed of video signal. Accordingly, the conventional MPEG-2 encoder pre-processor was capable of processing only one of SDTV or HDTV video.

At present, domestic TV broadcast adopts an analog system. But, in the future, the analog system for TV broadcast will be replaced with SDTV system, and more progressively, with HDTV system. If the system of TV broadcast is changed from SDTV system to HDTV system, the pre-processor for SDTV system will lose its usefulness, and a pre-processor for HDTV system must be developed over again.

SUMMARY OF THE INVENTION

To overcome the above-mentioned problem, it is an object of the present invention to provide a MPEG-2 encoder pre-processor for processing both of SDTV video and HDTV split picture video, separating a luminance signal and a chrominance signal when SDTV video is processed, and receiving externally a luminance signal, a chrominance signal and synchronizing signal when HDTV split picture video is processed. And it performs 4:2:2/4:2:0 video format conversion, preprocessing adaptive filtering and scene change detection for easy compression of the input video signal.

To accomplish the above object, the present invention provides an MPEG-2 encoder pre-processor for processing high definition television (HDTV) split picture video and standard definition television (SDTV) video including: signal separation and synchronizing signal detection means for separating luminance signals Y and chrominance signals C from SDTV video input signals by using a timing reference signal in SDTV signals according to the SDTV video signals, and generating SDTV synchronizing signals comprising a field discrimination signal, a vertical synchronizing signal and a horizontal synchronizing signal; multiplexing means having inputs connected to the outputs of the signal separation and synchronizing detection means for selecting SDTV video signal or HDTV split picture video signal from the input signals including luminance signals Y and chrominance signals C which are HDTV split picture video signals and HDTV split picture synchronizing signals which have the size corresponding to that of HDTV split picture, according to an external selection signal; and video processing means having inputs connected to the outputs of the multiplexing means for performing 4:2:2 to 4:2:0 video format conversion, adaptive filtering and other image processing of luminance signals Y and chrominance signals C input using the selected synchronizing signal, and generating a scene change detection signal and other signals needed in a video compression part.

BRIEF DESCRIPTION OF THE DRAWING

The above object and other advantages of the present invention will become more apparent by describing in detail a preferred embodiment thereof with reference to the attached drawing in which:

FIG. 1 is a block diagram showing a MPEG-2 encoder pre-processor for processing split HDTV picture video and SDTV video according to an embodiment of the present invention.

DETAILED DESCRIPTION OF THE INVENTION

The MPEG-2 encoder pre-processor for processing split HDTV picture video and SDTV video according to an embodiment of the present invention is shown in FIG. 1, which comprises a signal separation and synchronizing signal detector 10, a multiplexer 20, and a video processor 30.

The MPEG-2 encoder pre-processor is selected SDTV or HDTV split picture mode according to an external selection signal.

In order to process SDTV video signals, the external selection signal "1" is selected, and then SDTV video signals are input to the signal separation and synchronizing signal detector 10. International telecommunication union-recommendation(ITU-R) BT. 656 format signals, which are SDTV video signals, include timing reference signal.

Accordingly, the signal separation and synchronizing signal detector 10 separates luminance signals Y and chrominance signals C from SDTV video signals by using the timing reference signal in SDTV video signals, and then outputs them to the 2:1 multiplexer 20. And, SDTV synchronizing signals comprising a field discrimination signal, a vertical synchronizing signal and a horizontal synchronizing signal are output to the 2:1 multiplexer 20.

In order to process HDTV split picture video, the external selection signal "0" is selected, and then luminance signals Y and chrominance signals C are input to the 2:1 multiplexer 20, and at the same time, which have the size corresponding to that of HDTV split picture, are input to the 2:1 multiplexer 20.

If the selection signal is "1", the 2:1 multiplexer 20 selects SDTV video signal and DTV synchronizing signal each of which is separated into luminance signals Y and chrominance signals C. While, if the selection signal is "0", the 2:1 multiplexer 20 selects luminance signals Y and chrominance signals C which are HDTV split picture video signal, and outputs them to the video processor 30.

The video processor 30 performs 4:2:2 to 4:2:0 video format conversion, adaptive filtering and other image processing of the selected luminance signals Y and chrominance signals C input from the 2:1 multiplexer 20, using the selected synchronizing signal, and outputs the processed luminance signals Y and chrominance signals C.

The video processor 30 also outputs a scene change detection signal and other signals needed in a video compression part.

The video signals of HDTV have a large amount of to data(1,920 pixels×1,080 lines) and high speed(74.25 MHz). And, the MPEG-2 encoder system for HDTV mostly process the picture as a split picture. Thus, as described above, the pre-processor according to the present invention has advantages of processing both of SDTV video and HDTV split picture video by performing the processes such as 4:2:2/ 4:2:0 conversion, pre-processing adaptive filtering and scene change detection, so as to simplify the compression of the video from the input video signals. Accordingly, there is no need to develop pre-processors for SDTV and HDTV, individually.

What is claimed is:

1. MPEG-2 encoder pre-processor for processing high definition television (HDTV) split picture video and standard definition television (SDTV) video comprising:

signal separation and synchronizing signal detection means for separating luminance signals Y and chrominance signals C from SDTV video input signals by using a timing reference signal in SDTV video signals according to the SDTV video signals, and generating SDTV synchronizing signals comprising a field discrimination signal, a vertical synchronizing signal and a horizontal synchronizing signal;

multiplexing means having inputs connected to the outputs of the signal separation and synchronizing detection means for selecting SDTV video signal or HDTV split picture video signal from the input signals including luminance signals Y and chrominance signals C which are HDTV split picture video signals and HDTV split picture synchronizing signals which have the size corresponding to that of HDTV split picture, according to an external selection signal; and video processing means having inputs connected to the outputs of the multiplexing means for performing 4:2:2 to 4:2:0 video format conversion, adaptive filtering and other image processing of luminance signals Y and chrominance signals C input using the selected synchronizing signal, and generating a scene change detection signal and other signals needed in a video compression part.

* * * * *